United States Patent [19]
Bernstein

[11] 3,708,344
[45] Jan. 2, 1973

[54] ORGANIC DEPOLARIZER
[75] Inventor: Philip Bernstein, Yardley, Pa.
[73] Assignee: ESB Incorporated
[22] Filed: Dec. 10, 1970
[21] Appl. No.: 96,856

[52] U.S. Cl. .................................136/137, 136/155
[51] Int. Cl. ..............................................H01m 15/06
[58] Field of Search ..........................136/137, 6, 155

[56] References Cited

UNITED STATES PATENTS

| 3,438,813 | 4/1969 | Davis | 136/137 |
| 3,152,017 | 10/1964 | Coleman et al. | 136/137 |
| 3,481,792 | 12/1969 | Davis et al. | 136/137 |

OTHER PUBLICATIONS

Glicksman, Investigation of the Electrochemical Characteristics of Organic Compounds, J. Electrochemical Society, Pages 353–357, (1963).

Primary Examiner—Donald L. Walton
Attorney—Robert H. Robinson, Raymond L. Balfour, Anthony J. Rossi and Thomas A. Lennox

[57] ABSTRACT

Heterocyclic thiones are provided as depolarizers in secondary voltaic cells. The cells utilizing the organic depolarizer offer good stability in the uncharged condition nd good recharge characteristics after full discharge. A typical cell is the Leclanche system wherein the manganese dioxide is replaced by 2-imidazolidinethione.

14 Claims, 3 Drawing Figures

PATENTED JAN 2 1973 3,708,344

INVENTOR.
Philip Bernstein

INVENTOR.
Philip Bernstein

1

ORGANIC DEPOLARIZER

BACKGROUND OF THE INVENTION

Voltaic cells that convert chemical energy to electrical energy may be divided into primary and secondary type cells. Primary cells spontaneously convert chemical energy into electrical energy by a chemical reaction that is not reversible in a practical manner. Secondary cells, on the other hand, provide energy by chemical reactions that are reversible allowing recharge to essentially the same starting materials. Cells contain an anode, capable of being oxidized, such as zinc, magnesium, lithium, and cadmium, a cathode or depolarizer capable of being reduced, such as manganese dioxide, silver oxide, and mercuric oxide, an electrolyte to provide ionic contact between the electrodes, and a separator to prevent physical contact between the electrodes. The common flashlight battery is the Leclanche cell which employs manganese dioxide as the depolarizer in a carbon-zinc chloride mix with a zinc anode and a zinc chloride-ammonium chloride electrolyte aqueous solution. The Leclanche cell is not efficient as a secondary cell and the stability of the cell is affected by time.

There is need for a secondary cell that will deliver greater than 1 volt that is stable indefinitely until needed. Therefore, an object of this invention is to provide a depolarizer that remains undegraded and unreacted until an electrical charge is placed on the cell. A further object is to provide a cell that utilizes a reversible chemical reaction such that it may be recharged for subsequent use. A particular object is a cell that may be recharged even after deep and complete discharge and does not self-discharge for a reasonable time.

A particular object of the invention is to provide a cell that had flat discharge characteristics, that is, voltage output is relatively constant over an extended period until discharge. A particular object is that even after numerous recharge cycles, the output voltage remains at essentially the same level provided after the first charge despite any loss in capacity of the cell.

SUMMARY OF THE INVENTION

This invention is an organic depolarizer having the structural formula:

(I)

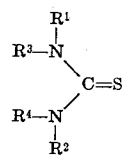

in which $R^1$ and $R^2$ are hydrogen, or substituted or unsubstituted radicals in particular alkyl, including cycloalkyl, alkoxy, alkanoyl, alkenyl, aryl, aralkyl or alkaryl; and $R^3$ and $R^4$ are alkylene, alkenylene, alkylidene or alkylidyne, wherein $R^3$ and $R^4$ are joined together by carbon to carbon linkage or through nitrogen, sulphur, or oxygen atoms to form a heterocyclic ring. Typical substitutions include halo, such as chloro, bromo and the like, alkoxy, such as methoxy, ethoxy, and the like, hydroxy, cyano, nitro, and the like. Preferred thiones of formula I are those having $R^3$ and $R^4$ joined through carbon atoms in the alpha position to the nitrogen atoms.

The replacement of the manganese dioxide in the Leclanche cell with the depolarizer of this invention such as 1-methyl-4-imidazoline-2-thione yields no spontaneous chemical reaction so that the cell has no initial capacity. After charging the cell with direct current, it provides good flat discharge characteristics and may be recharged many times.

DESCRIPTION OF THE PREFERRED EMBODIMENTS

Figure 1:
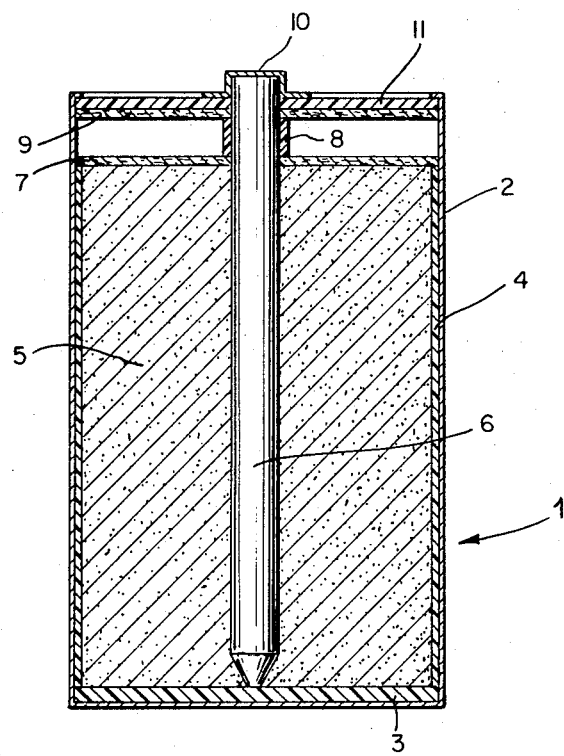
FIG. 1 is a cross-sectional elevational view of a typical cylindrical voltaic cell according to the invention.

This invention may be further described as a secondary voltaic cell comprising in combination with a highly electropositive metal anode and an electrolyte, a cathode composition comprising a mixture of carbon and an organic depolarizer having the formula:

(II)

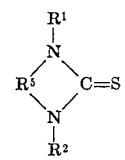

wherein $R^1$ and $R^2$ are preferably hydrogen, unsubstituted alkyl of one to eight carbon atoms, such as methyl and 2-ethylhexyl, or alkyl of one to eight carbon atoms having substituted thereon at least one chemical substituent chosen from the group consisting of alkoxy having one to four carbon atoms, such as methoxy, alkanoyl, such as acetyl, halo, such as chloro, nitro or cyano and $R^5$ is alkylene or alkenylene of two to eight carbon atoms. Preferred are the thione depolarizers wherein $R^5$ is ethylene or vinylene and $R^1$ and $R^2$ are hydrogen or lower alkyl, preferably methyl.

It is recognized that the depolarizer must be in the oxidized form in order to act as a cathode in the cell. In a secondary cell of this type the depolarizer is most easily introduced into the cell in the reduced form to be later oxidized during charging. Thus, throughout the specification the depolarizer is spoken of as a depolarizer system to include the forms both before and after charging.

Typical heterocyclic thiones of this invention include, but are not limited to where $R^5$ of formula II is ethylene: 2-imidazolidinethione ($R^1$ and $R^2$ are H), 1-methyl-2-imidazolidinethione ($R^1 = CH_3$ and $R_2 = H$), 1,3-dimethyl-2-imidazolidinethione, 1-(4-chlorobutyl)-2-imidazolidinethione, 1-(3-methoxypropyl)-2-imidazolidinethione, 1-methyl-3-acetyl-2-imidazolidinethione, 1-(8-nitrooctyl)-2-imidazolidinethione, 1-vinyl-2-imidazolidinethione, 1-benzyl-2-imidazolidinethione, 1 (p-nitropheyl)=2-imidazolidinethione, 1-cyclohexyl-2-imidazolidinethione, 1-(m-tolyl)-2-imidazolidinethione, and the like; where $R^5$ is vinylene: 4-imidazoline-2-thione ($R^1$ and $R^2$ are H), 1-methyl-4-imidazoline-2-thione ($R^1$ is methyl and $R^3$ is H), 1-(p- nitrophenyl)-4-imidazoline-2-thione, 1 (2-ethylhexyl)-4-imidazoline12-thione; 2-tetrahydropyrimidinethione ($R^5$ is propyl, and $R^1$ and $R^2$ are H),($R^5$ is octyl, and $R^2$ and $R^3$ are H), and 1-oxa-3, 5-diaza-4-thione ($R^1$ and $R^2$ are hydrogen and $R^3$ and $R^4$ are methylene joined together by an oxygen atom), and the like.

On the basis of available evidence, the following reversible reaction is believed to take place with the depolarizer where at least one of the nitrogen atoms is hydrogen substituted:

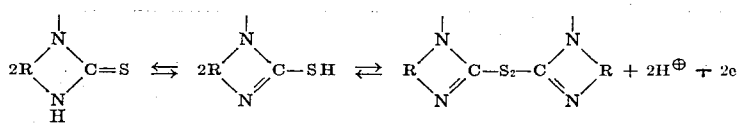

It will be clear that with the thiones of this invention wherein neither of the nitrogens are hydrogen substituted another reaction must be taking place. In any case the invention is in no way limited to this hypothetical reaction and other reactions may take place in major or minor degrees. When the nitrogen atoms are substituted with functional groups capable of being reduced the reaction is even more complicated.

As is the case with most depolarizers, the compounds of this invention are relatively poor electrical conductors, therefore, in order to maintain a low internal impedance of the cell, it is generally necessary to mix with the depolarizer a relatively inert material to improve conductivity to the current collector. Conductive carbon is particularly preferred as a means of improving conductivity to the current collector, which is usually a graphite rod or bar in the Leclanche system. Acetylene black is an example of carbon particularly useful in admixture with the depolarizer. The ratio of conductive carbon to cathode depolarizer may vary for example, between 90:10 and 10:90 by weight, preferably 60:40 to 40:60, but is generally in a ratio of about 1:1. Additional materials may be included in the preparation of the cathode such as binders of which polyvinyl alcohol is an example.

The depolarizers of this invention may be prepared by any means. Generally, the heterocyclic thiones are prepared by reacting a diamine with carbon disulfide. The resultant thiocarbamic acid salt is then treated with hydrochloric acid at elevated temperatures to effect ring closure which yields hydrogen sulfide as a byproduct.

The anode materials generally useful with the depolarizers of this invention are metals of groups II and III of the Periodic Table which are high in the electromotive series. These include zinc, cadmium, lithium, magnesium, aluminum and the like. Zinc is the preferred anode metal. In referring to anode metals it is intended to include not only the pure metal but various alloys thereof. Properties of the group II and group III metals which make them useful in this invention are corrosion resistance and ease of alloying the metallic materials, including amalgamating zinc, alloying magnesium with aluminum and zinc, etc. In these alloys the electrochemically active metal will comprise at least about 50 percent of the total alloy weight and usually above 90 percent of the total weight of the alloy.

The electrolyte may be an aqueous or non-aqueous solution containing a soluble salt such as sea water, water to which one or more soluble salts have been added or an organic solvent with salts added. Halides and halates, particularly chlorides or chlorates of alkali metals, alkaline earth metals, and ammonium cations are the preferred soluble salts in the electrolyte. For example, lithium perchlorate in propylene carbonate is effective. Of particular preference is the Leclanche electrolyte system of ammonium chloride and zinc chloride. The electrolyte may be prepared by dissolving the salt or salts in water in a concentration between about 30 grams per liter of water and that producing a saturated solution at ordinary service temperatures. It is not uncommon to include in the electrolyte other components such as a mercuric salt which amalgamates the zinc during operation of the cell.

Figure 3:
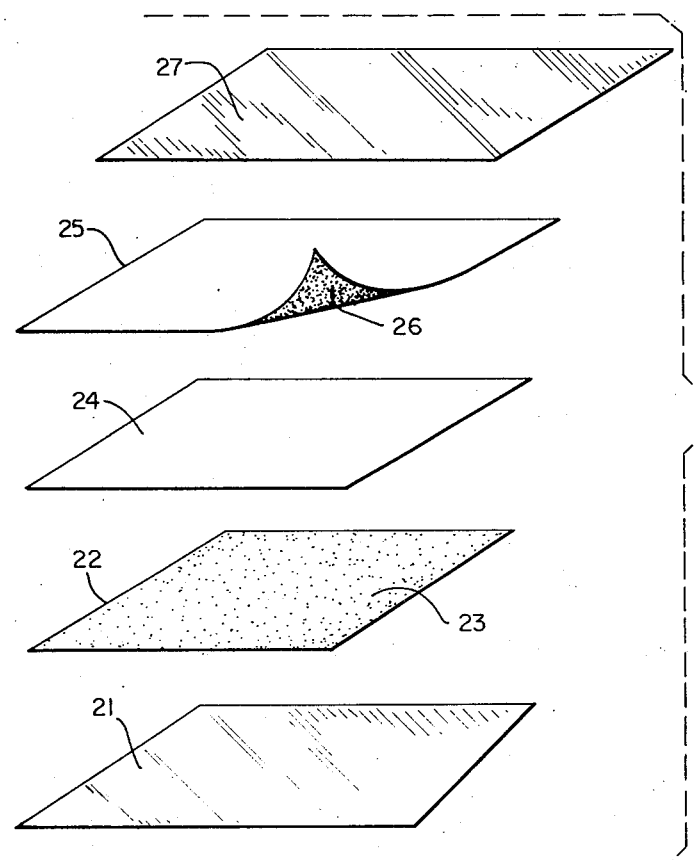
FIG. 3 is a view of a typical thin film construction battery.

The cell construction in which the present invention is useful is frequently cylindrical of standard shape and size to fit electrical equipment. However, the size and shape is determined by the capacity requirements and the space available. One technique in preparing flat batteries is to coat a paper separator with the anode powder in a binder on one surface and the cathode mix in a binder on the other surface as depicted in FIG. 3. The coated sheets may then be stacked and stamped to produce batteries of the desired voltage and size.

The separators useful in the construction of the battery depend on the configuration and the choice of the electrode materials. The separator may generally be any porous material such as cellulosic films, including cellophane, kraft paper, kraft paper treated with a gel-like material such as carboxymethyl cellulose, polyvinyl alcohol, or a starch-flour gel, porous ceramics, porous synthetic polymer films and other organic or inorganic structures. The criticality of the separator is that it prevent electrical contact between the electrodes but allow ionic connection between them.

The following examples are provided by way of illustration and are in no way intended to limit the scope of the invention. All percentages and parts are by weight unless otherwise noted.

EXAMPLE 1

The depolarizer 2-imidazolidinethione (hereinafter referred to as compound I) is prepared in a 1-liter round bottom flask into which is placed 60 grams (1.0 mole) ethylene diamine, 150 ml. of 95 percent ethanol and 150 ml. water. A reflux condenser is fitted to the top of the flask and 60 ml of carbon disulfide is dripped into the top of the condenser. Initially about 8 ml of the carbon disulfide is added in one portion to the stirred contents of the flask. The reaction is controlled by cooling such that as the carbon disulfide is added, the reaction mixture refluxes gently. After the carbon disulfide is all added the flask is heated for 1 hour at 70° to 80° C. A charge of 8 ml of 0.3N hydrochloric acid is then added and the mixture refluxed for 10 hours. After cooling the product is precipatated with 500 ml of cold acetone to produce 87 grams (85 percent yield) of compound I which melted at 198°–200° C. (reported 197°–198° C).

EXAMPLES 2 THROUGH 5

Using the same procedure as Example 1, the following compounds II through V are prepared. In each Example, the compounds are prepared by using the appropriate diamine, for example, compound V is prepared by replacing the ethylene diamine with propylene diamine.

| Compound Number | Chemical Name | Melting Point (°C) | Reported Melting Point (°C.) |
|---|---|---|---|
| II | 1-methyl-2-imidazolidinethione | 129–129.5 | 129 |
| III | 1,3-dimethyl-2-imidazolidinethione | 110–111 | 109–110 |
| IV | 1-ethyl-2-imidazolidinethione | 80–81 | 79–80 |
| V | 2-tetrahydropyrimidenthione | 207–205 | 207–208 | thick non-plasticized cellophane separator and placed between two zinc plates, 0.25 mm thick. The electrode package is placed in a container and covered with the same electrolyte solution. The performance of the cell is monitored through a strip chart recorder. The amount of organic depolarizers utilized in each cell is about 0.1 grams and the open circuit voltage of the cell after being charged for 1.1 hours at 20 milliamperes (MA) is 1.48 volts for compound I.

When discharged at 1.55 MA/cm$^2$ the average operating voltage to a 0.5 volt (V) cutoff was 1.25 V to yield an energy density of 100 watt-hours per pound (WH/lb.), which is 65 percent of theoretical.

In a similar fashion, compounds II through VII are utilized as depolarizers to yield the typical results on Table 1.

In each case the depolarizer showed no electrochemical capacity in the original state. After the cells were charged, the depolarizers were converted to the electrochemically active species. All of the compounds provided operating voltages with discharge curves essentially flat over the major part of discharge.

TABLE 1.—RESULTS WITH CARBON PASTE 3 PLATE CELLS PREPARED IN EXAMPLE 8

| Compound | I | II | III | IV | V | VI | VII |
|---|---|---|---|---|---|---|---|
| Structural formula | (structure) | (structure) | (structure) | (structure) | (structure) | (structure) | (structure) |
| Average operating voltage (I$_D$ = 1.55 ma./cm.$^2$) | 1.25 | 1.23 | 1.13 | 1.21 | 1.11 | 1.12 | 1.14 |
| Theoretical capacity in wh./lb. | 154 | 145 | 108 | 114 | 117 | 140 | 125 |
| Experimental cap. in wh./lb. | 100 | 80 | 65 | 95 | 93 | 105 | 75 |
| Efficiency, percent | 65 | 55 | 60 | 83 | 79 | 70 | 60 |

EXAMPLES 6 AND 7

The preparation of 4-imidazoline-2-thione is described by Wohl and Marckwald (Berichte 22, 1354, 1889) and is modified as follows: In a 500 milliliter round bottom flask cooled to 0°C, is placed 33 grams of β-amino acetal. The charge is maintained at 0°C. and treated with 90 milliliters of 0.3N hydrochloric acid which is added drop-wise. After the acid is added 27 grams of potassium thiocyanate is added while cooling. crystalline product precipitates, is filtered and dried to yield 12.75 grams (50 percent yield) which has a melting point of 224°–226° C (reported 225°–226° C). Hereinafter this compound will be referred to as compound VI.

The compound 1-methyl-4-imidazoline-2-thione is prepared in a similar fashion, hereinafter referred to as compound VII.

The solution is then heated to 50°–52° C. and maintained at that temperature for 16 hours. On cooling the

EXAMPLE 8

Compounds I through VII are used as depolarizers in a carbonpaste three plate cell. A carbon paste is prepared by adding an aqueous electrolyte solution of 280 parts ammonium chloride and 145 parts zinc chloride in 1 liter water to a mixture of 50 percent depolarizer and 50 percent carbon black. The paste is then applied to a gold screen which acts as the current collector. The coated screen is wrapped in a 0.025 mm

EXAMPLE 9

Figure 2:
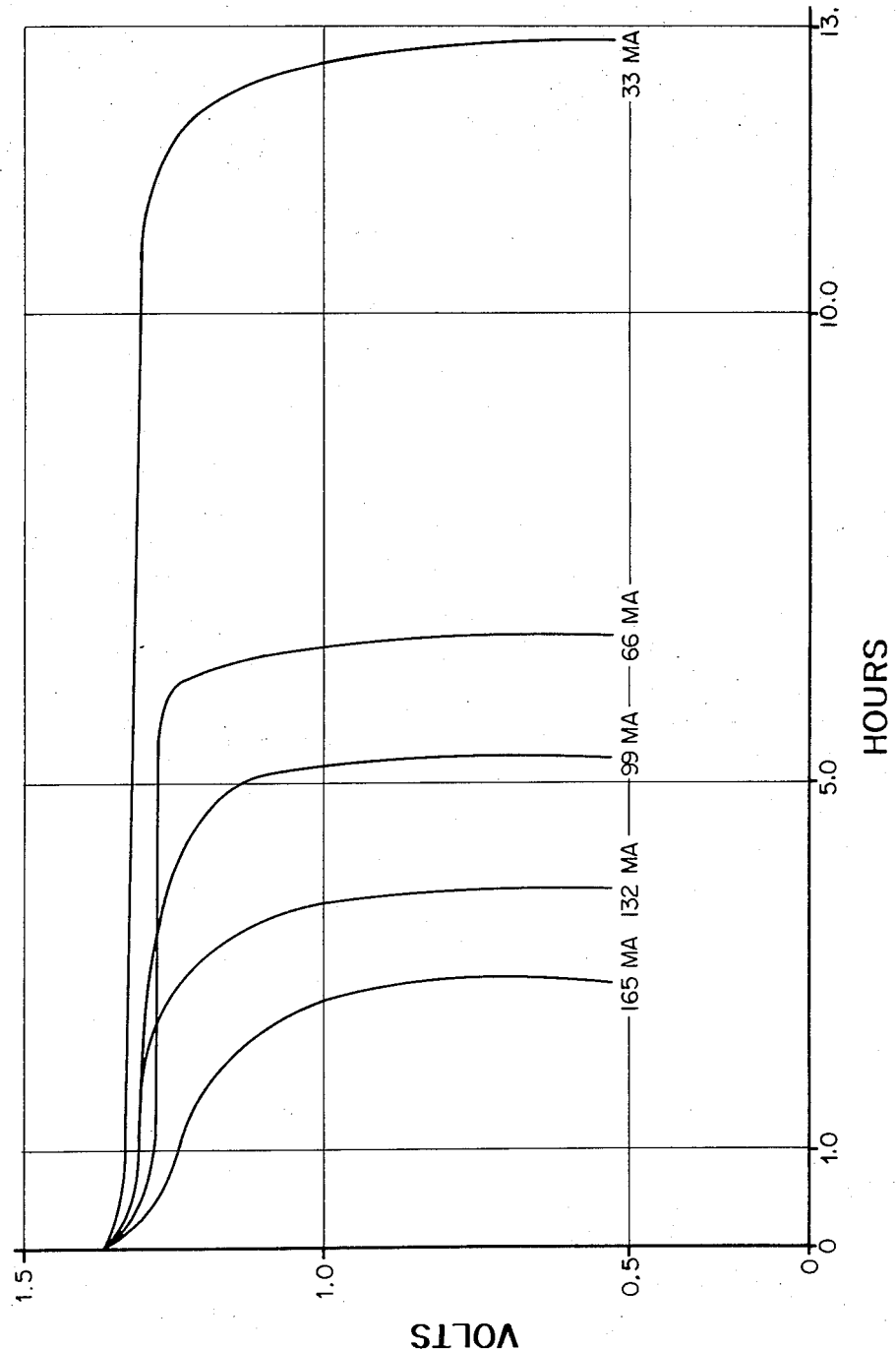
FIG. 2 is a series of typical discharge curves under various current loads for a typical cell using the depolarizer of this invention.

When the depolarizers of this invention are incorporated into standard cylindrical cells, a typical construction is pictured on FIG. 1. The cell 1 is prepared by placing a circular polyethylene bottom liner 3 in a standard "D" size zinc can 2. A cylindrical starch cellophane separator 4 is placed in the cell after which a wet mix 5 comprising 1 ml of an electrolyte solution of 145 parts zinc chloride and 280 parts ammonium chloride in a liter of distilled water per 0.43 grams of a mixture of 50 percent compound I and 50 percent carbon black is tapped into the cell around carbon pencil 6 to fill the can about seven-eights full. A kraft paper bottom washer 7 is placed on the wet mix followed by a high density polyethylene air spacer sleeve 8 and finally followed by a kraft paper top washer 9. A brass cap 10 is placed on the top of the carbon pencil 6 and a commercially available room temperature curing epoxy resin sealer 11 is poured on top of the top washer 9. The epoxy resin 11 seals the zinc can 2, the top washer 9, and the brass cap 10 to minimize leakage from the cell. The cell is evaluated at various drains and typical discharge results are provided in FIG. 2.

EXAMPLE 10

Using the procedure of Example 9 cells are prepared using compound VI. The cells are charged at 1.62 volts to 100 percent capacity calculated on the organic depolarizer theoretical electrochemical reaction. The discharge characteristics were evaluated by determining the number of hours until the output dropped to 0.6 volts under at 41 ohm discharge load 4 hours on and 4 hours off load after each recharge. Typical values are provided in Table II.

TABLE II

Time to Discharge of Cycles 4 Hours Discharge - 4 Hours Rest to 0.6 Volts for Leclanche Cells Using Compound VI as Depolarizer

| Recharge | Discharge |
|---|---|
| 1st | 20 |
| 2nd | 35 |
| 3rd | 35 |
| 4th | 32 |
| 5th | 24 |
| 6th | 24 |
| 7th | 24 |
| 8th | 24 |
| 9th | 24 |
| terminated | |

EXAMPLE 11

A thin cell is prepared by stacking the parts pictured in exploded view—FIG. 3. A sheet of commercially available conductive plastic, Condulon 22 is coated with a deposition of zinc metal 23, and placed on a steel plate 21 with the zinc coating 23 away from the steel. A kraft paper separator 24 which is of larger dimension than the other sheets, is placed on the zinc coating 23. A second sheet of conductive plastic 25 is coated with a wet mix 26 of the carbon-depolarizer-electrolyte mixture used in Example 9, and placed on separator 24 with the wet mix 26 against the separator. A second steel plate 27 is placed on top of the conductive plastic sheet 25 and the edges of the sandwich are sealed with a commercially available room-temperature curing epoxy resin. When electrical conductors are attached to the steel plates, good results are obtained.

I claim:

1. A secondary voltaic cell having an anode, a cathode, a separator therebetween and an electrolyte, said cathode comprising an electrically conductive material and an organic depolarizer having the chemical formula:

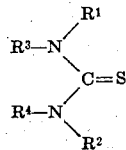

wherein $R^1$ and $R^2$ are each selected from the group of substituted and unsubstituted chemical substitutents consisting of hydrogen, alkyl, alkenyl, aryl, alkoxy, alkanoyl, aralkyl and alkaryl, and $R^3$ and $R^4$ are each selected from the group consisting of alkylene, alkenylene, alkylidene and alkylidyne joined together by carbon to carbon linkage or through nitrogen, sulfur or oxygen atoms to form a heterocyclic ring; and said cell being characterized by requiring charging prior to discharge whereby said depolarizer is oxidized to a higher oxidation state.

2. The cell of claim 1 wherein $R^3$ and $R^4$ are joined through carbon to carbon linkage to form between them an alkylene or alkenylene group and the electrolyte consists essentially of a salt solution wherein the salt comprises a cation selected from alkali metals, alkaline earth metals, zinc and ammonium ions and an anion selected from halide and halate ions.

3. The cell of claim 2 wherein $R^3$ and $R^4$ are joined together through the carbon atoms which are in the alpha position to the nitrogen atoms of the heterocyclic ring thus formed.

4. The cell of claim 3 wherein $R^3$ and $R^4$ are joined together to form an ethylene or vinylene group.

5. The cell of claim 4 wherein $R^1$ and $R^2$ are each chosen from the group consisting of hydrogen or methyl.

6. The cell of claim 1 wherein $R^1$ and $R^2$ contain substituents chosen from the group consisting of halo, alkoxy, hydroxy, cyano and nitro.

7. The cell of claim 1 wherein $R^1$ and $R^2$ are chosen from the group consisting of hydrogen, unsubstituted alkyl of one to eight carbon atoms and alkyl of one to eight carbon atoms having substituted thereon at least one chemical substituent chosen from the group consisting of alkoxy having one to four carbon atoms, alkanoyl, having one to four carbon atoms, halo, nitro and cyano.

8. The cell of claim 1 wherein $R^1$ and $R^2$ are each chosen from the group consisting of hydrogen and alkyl of one to eight carbon atoms.

9. The cell of claim 1 wherein $R^1$ and $R^2$ are each chosen from the group consisting of hydrogen and methyl.

10. The cell of claim 1 wherein the cathode composition comprises a mixture of 10 to 90 percent by weight carbon and 90 to 10 percent by weight of the organic depolarizer.

11. The cell of claim 1 wherein the organic depolarizer is 2-imidazolidinethione.

12. The cell of claim 1 wherein the organic depolarizer is 1-methyl-2-imidazolidinethione.

13. The cell of claim 1 wherein the organic depolarizer is 4-imidazoline-2-thione.

14. The cell of claim 1 wherein the organic depolarizer is 1-methyl-4-imidazoline-2-thione.

* * * * *